United States Patent [19]
Tokunaka

[11] Patent Number: 4,580,174
[45] Date of Patent: Apr. 1, 1986

[54] APPARATUS FOR RECORDING AND/OR REPRODUCING VIDEO AND AUDIO SIGNALS

[75] Inventor: Junzo Tokunaka, Yokohama, Japan

[73] Assignee: Sony Corporation, Tokyo, Japan

[21] Appl. No.: 553,195

[22] Filed: Nov. 18, 1983

[30] Foreign Application Priority Data

Nov. 19, 1982 [JP] Japan ............................. 57-204384
Nov. 27, 1982 [JP] Japan ............................. 57-208166

[51] Int. Cl.$^4$ ............................................. H04N 5/782
[52] U.S. Cl. ................................... 358/328; 358/330; 360/19.1
[58] Field of Search ............... 358/327, 328, 329, 330; 360/19.1, 33.1

[56] References Cited
U.S. PATENT DOCUMENTS 4,509,083  4/1985  Nakano ............................. 360/19.1

*Primary Examiner*—Donald McElheny, Jr.
*Attorney, Agent, or Firm*—Alvin Sinderbrand; Lewis H. Eslinger

[57] ABSTRACT

A video and audio signal recording apparatus includes a first frequency modulator in which a first audio signal to be recorded that may represent a stereophonic left channel modulates a first carrier to produce a first FM audio signal, and a first frequency convertor converts the carrier frequency of the first FM audio signal to a different carrier frequency higher than the first carrier frequency to form a second FM audio signal. A second frequency modulator modulates a second audio signal to be recorded that may represent a stereophonic right channel to produce a third FM audio signal, and a second frequency converter converts the third FM audio signal into a fourth FM audio signal having a carrier frequency that is higher than any of the other FM audio signals so modulated. The first and third FM audio signals are mixed to form a first mixed audio signal and the second and fourth FM audio signals are mixed to form a second mixed audio signal, which are both combined in a mixing circuit with a composite color video signal to form first and second mixed audio and video signals which are fed to first and second magnetic recording heads, respectively. Reproducing apparatus reproduces the recorded signal.

16 Claims, 23 Drawing Figures

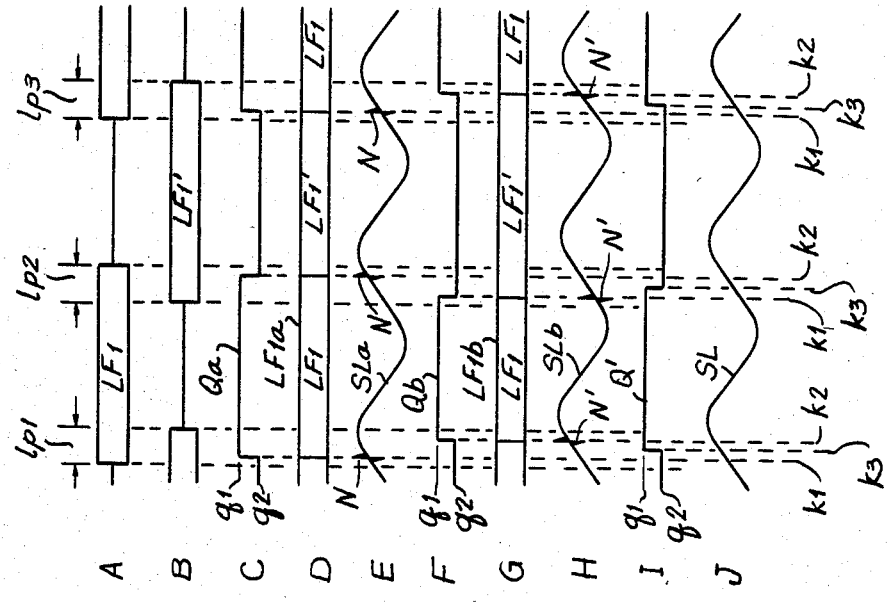
FIG. 10
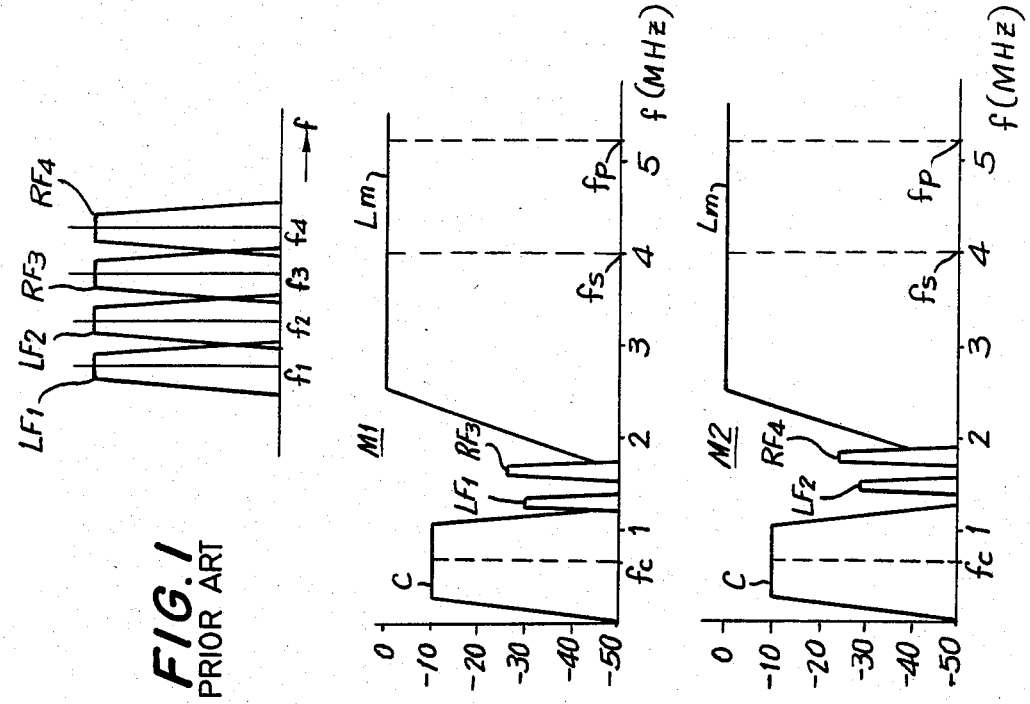
FIG. 1 PRIOR ART
FIG. 2 PRIOR ART
FIG. 3 PRIOR ART

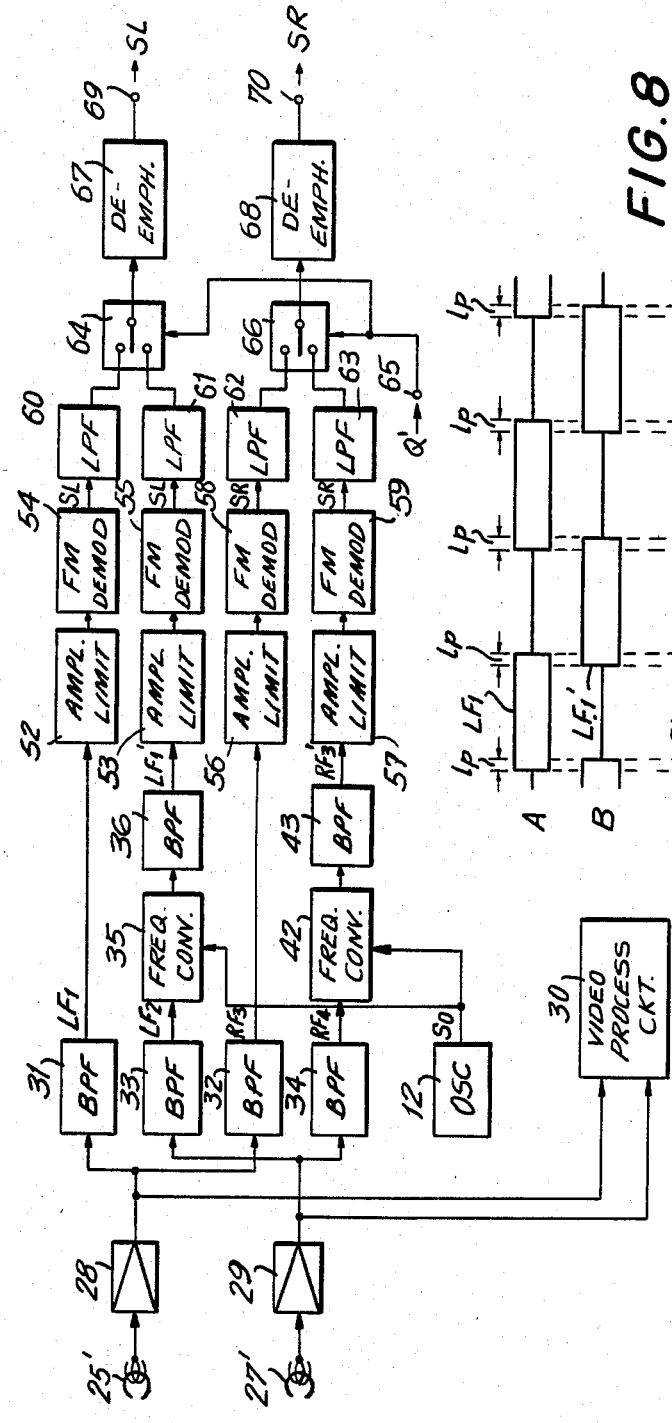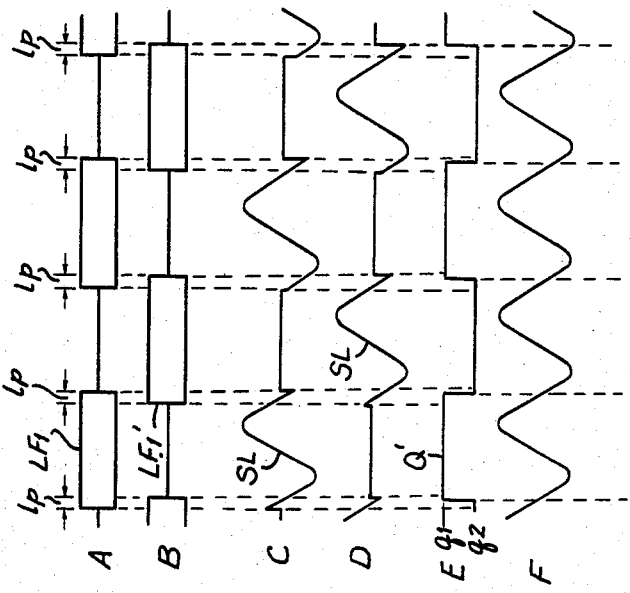

APPARATUS FOR RECORDING AND/OR REPRODUCING VIDEO AND AUDIO SIGNALS

BACKGROUND OF THE INVENTION

1. Field of the Invention

This invention relates generally to an apparatus for magnetically recording and/or reproducing video and audio signals, which may constitute television signals, and more particularly is directed to improvements in the recording and/or reproducing of the audio signal and specifically to stereo audio signals.

2. Description of the Prior Art

In the case of video tape recorders known in the prior art for recording a color television signal on a magnetic tape, the chrominance and luminance signal components of the color video signal are separated, and the carrier frequency of the chrominance signal is down-converted in relation to the frequency of the luminance component. The luminance component frequency modulates a relatively high-frequency carrier and the high sideband of the frequency-modulated luminance signal component and the frequency-converted chrominance signal are mixed or combined to form a composite video signal that is recorded on the magnetic tape in successive parallel tracks that extend obliquely relative to the longitudinal or running direction of the magnetic tape. These tracks are commonly referred to as "slanted tracks38 . Typically, when recording color television signals in such prior art system the audio signals are not recorded in the slanted tracks but are recorded in a more conventional fashion in a single or double track running in the longitudinal direction of the magnetic tape and are typically referred to as "audio tracks". In the above-described video tape recording system known in the prior art, the slanted tracks containing the frequency down-converted chrominance signal and the frequency-modulated luminance signal are formed by at least two rotary magnetic heads which are adapted to scan alternately the magnetic tape along a path that is oblique to the running direction of the tape. The heads are supplied then with the video signals to be recorded at the appropriate times.

One prior art technique that has been used to increase the recording density of the composite color video signal on the magnetic tape is to eliminate any space between adjacent slanted tracks. Such inter-track spaces are typically referred to as guard bands. Nevertheless, one adverse effect of the elimination of such guard bands is the creation of cross talk between the signals on these closely arranged tracks during reproducing. This problem of cross talk has been solved by utilizing a heretofore undesired aspect of video tape recording relating to azimuth loss, which comes about when the gap of the reproducing head is not aligned with the gap of the head used to record the signal. Thus, by providing the two rotary magnetic heads with substantially different azimuth angles and requiring that each head gap angle must essentially match the azimuth angle of the track being reproduced, a substantial azimuth loss will obtain relative to the high-frequency components of any potential cross talk that is derived from signals recorded in adjacent tracks. Accordingly, cross talk is substantially suppressed in regard to the FM modulated luminance signal. Nevertheless, the azimuth loss phenomenon is not effective with low-frequency signals and, thus, cross talk remains in regard to the frequency down-converted chrominance signal, which has been moved down to a relatively low-frequency band. The prior art involved various measures in attempts to eliminate or minimize the low-frequency component of this cross talk and as disclosed in U.S. Pat. No. 4,007,482 issued Feb. 8, 1977, having a common assignee herewith, such low-frequency cross talk relative to the frequency down-converted chrominance signal component is attenuated by recording the chrominance signal component with different first and second carriers in the adjacent tracks, respectively. Such first and second carriers permit the chrominance signal components to be distinguished from each other and, upon reproduction of the signal recorded in a particular track, the low-frequency band of the cross talk from the tracks adjacent thereto can be suppressed or eliminated. One specific approach disclosed in the above-identified patent involves recording the chrominance signal component of the color video signal with first and second frequency-converted signals having the same carrier frequency in alternate tracks with a constant phase and in subsequent alternate tracks with the phase reversed in polarity for successive line intervals.

This scheme will assure that during playback or reproduction the cross talk effects can be minimized or eliminated. During reproduction of signals recorded in this fashion the two successive line intervals may be added together by means of delay lines, such as embodied by a comb filter. Nevertheless, in view of the above approaches to recording the video portion of a color television signal, the audio signals thereof, as in the case of left and right stereophonic signals, are always supplied to the tape in the running or longitudinal direction by dedicated, fixed heads that are continuously in contact with the magnetic tape to lay down the audio tracks corresponding to the left and right stereophonic signals. As is well known, in magnetic tape recording the bandwidth of the signal that can be recorded is determined to a great extent by the relative velocity between the recording head and the record medium. In regard to recording color video signals, this relative velocity between the tape and the head is provided by the rotational speed of the rotary magnetic heads and, thus, in order to achieve high-density recording without requiring large lengths of tape the transport speed of the magnetic tape is relatively low, for example, a typical tape speed is 1.33 cm/sec. This linear speed of the tape relative to the fixed heads that record the audio signals is quite low, and this results in a reduction in the quality of the audio recording that can be made.

One proposal to increase the quality, that is, the fidelity, of the audio signals in video tape recorders has been to frequency modulate the audio signals then mix the frequency-modulated audio signals with the composite color video signals, with the mixed or combined signals then being supplied to the rotary magnetic heads so that the audio signals are also recorded in the slanted tracks. This then provides a sufficiently high relative velocity between the head and the tape to provide a wide bandwidth for the recorded audio signals. Nevertheless, even this scheme has met with drawbacks because the frequency-modulated audio signals recorded in the next adjacent tracks have the same carrier frequency. Therefore, each audio signal reproduced from a particular track would contain a beat frequency interference due to the audio component of the cross talk from the adjacent tracks. While the level of such cross talk was reduced by the aforementioned azimuth loss phenomenon, the quality of the audio signal was deleteriously affected.

The prior art then proposed a solution to this problem in an improved system for recording video and audio signals in which the audio signal was formed into two FM signals each having different carrier frequencies and different frequency deviation ranges, that is, different locations on the frequency spectrum. In this proposed system the audio signal is formed into two FM signals having different carrier frequencies and different frequency deviation ranges, and the two FM audio signals thus obtained are supplied to the two rotary magnetic heads, along with the processed composite color video signals, for recording in the plurality of slanted tracks formed on the magnetic tape. It is appreciated, of course, that the slanted tracks do not have guard bands arranged between adjacent tracks, and the desired relative isolation of the FM audio signals in adjacent slanted tracks is provided by the different respective carrier frequencies.

While the interference caused by crosstalk between adjacent slanted tracks can be substantially reduced in the reproduction mode of the apparatus described above for converting a single channel audio signal into a pair of FM audio signals and to record the audio signals on the slanted tracks together with the video signal, it has been proposed to use two frequency modulators that operate to frequency-modulate the audio signal with two carriers having different frequencies. Nevertheless, in such a situation it is necessary to construct each frequency modulator so that it has its own individual frequency stabilizing means, such as a phase-locked-loop, in order to obtain a stable FM audio signal that has an accurate carrier frequency. Accordingly, the circuit arrangement to accomplish this, and to obtain the recordation of the FM audio signals, is quite complicated in its configuration, resulting in increased costs of commercial products.

Furthermore, in a reproducing system utilized to reproduce the audio signals from magnetic tape in which each audio signal has been recorded as two FM signals in the slanted tracks without guard bands so that interference caused by cross talk between adjacent slanted tracks is reduced, it has been proposed to demodulate the FM audio signals, which have respective different carrier frequencies and which are obtained respectively from the two reproducing rotary magnetic heads that alternately trace the slanted tracks, by using two individual demodulators that have central frequencies to discriminate the corresponding frequencies of the respective FM audio signals. Nevertheless, in this proposed system for reproducing the audio signals it is required to have two frequency demodulators having respective different central frequencies for discrimination of the audio signal of each channel and, accordingly, the resultant circuit configuration is quite complex. Additionally, another undesirable feature of this proposed demodulation scheme involves a measurable difference that may be present between the frequency-demodulated outputs obtained from the two frequency demodulators, caused by frequency demodulating a single channel audio signal using two frequency demodulators having different frequency discriminating characteristics.

OBJECTS AND SUMMARY OF THE INVENTION

Accordingly, it is an object of this invention to provide apparatus for recording and/or reproducing video and audio signals, and which avoids the previously described problems associated with the apparatus of the prior art.

More specifically, it is an object of this invention to provide an apparatus for recording and/or reproducing video and audio signals, and which is capable of high-density recording of the video signal, as well as high-quality recording and reproducing of the audio signal or signals.

Another object of this invention is to provide an apparatus which can record and/or reproduce video and audio signals in which FM audio signals and a color video signal are mixed and supplied to two rotary magnetic heads and recorded in a plurality of slanted tracks arranged without guard bands therebetween on a magnetic tape, in such a manner that the carrier frequencies of the FM audio signals recorded in each of two adjacent slanted tracks are not identical and in which the circuit provided to convert each audio signal into the two FM signals having respective different carrier frequencies comprises a simplified configuration in regard to known circuits for this purpose.

Another object of this invention is to provide an apparatus for recording and/or reproducing video and audio signals which can record and reproduce plural channels of audio signals as represented, for example, by stereophonic left and right signals, while still permitting high-density recording of a video signal and without degradation of the qualities of either the audio or video signals.

A still further object of the present invention is to provide apparatus for recording and/or reproducing video and audio signals, as aforesaid, and in which the carrier frequencies of the FM audio signals that are recorded in two adjacent slanted tracks are not identical to each other and in which the circuit that frequency-demodulates the FM audio signals reproduced from the record medium comprises a simplified configuration and suppresses undesirable errors in the frequency-demodulated output of the demodulating circuit.

According to an aspect of this invention, a video and audio signal recording apparatus comprises a first frequency modulator for modulating a first carrier by a first audio signal to be recorded, for example, by a stereophonic left signal, and this signal is frequency converted by means of a signal from a local oscillator to form a second audio signal of carrier different than the first audio signal, thereby providing first and second FM audio signals, respectively, and a second frequency modulator for modulating a third carrier by a second audio signal to be recorded, for example, by a stereophonic right signal, and the third audio signal to be recorded being converted in a second frequency convertor connected to the local oscillator, thereby providing third and fourth FM audio signals, respectively, with such first, second, third, and fourth carriers all having different respective frequencies, and signal adders for adding the first and third audio signals and the second and fourth audio signals to produce two FM audio signals and recording and mixing means for mixing the two audio signals to be recorded with a video signal, and thereby providing a first mixed audio and video signal, and a second mixed audio and video signal, and first and second magnetic heads having different azimuth angles, respectively, receiving the first and second mixed audio and video signals for recording in respective record tracks adjacent each other on a magnetic recording medium.

The above and other objects, features, and advantages of the present invention will be apparent from the following detailed description of an illustrated embodiment, which is to be read in conjunction with the accompanying drawings in which the same reference numerals identify the corresponding elements and parts in the several views.

BRIEF DESCRIPTION OF THE DRAWINGS

FIG. 1 is a diagram showing the frequency spectrum of frequency-modulated signals known for use in recording and/or reproducing apparatus;

FIG. 2 is a diagram showing the frequency spectrum of mixed audio and video signals, which are recorded in parallel adjacent tracks by apparatus known in the prior art;

FIG. 3 is a diagram showing the frequency spectrum of mixed audio and video signals, which are recorded in slanted tracks on a record medium by apparatus known in the prior art;

FIG. 7 is a schematic block diagram showing apparatus for reproducing video and audio signals recorded by the apparatus of FIG. 5;

FIGS. 8A–8F are waveform diagrams to which reference will be made in explaining the operation of the apparatus of FIG. 7;

FIGS. 10A–10J are waveform diagrams to which reference will be made in explaining the operation of the apparatus of FIG. 9.

DESCRIPTION OF A PREFERRED EMBODIMENT

Figure 4:
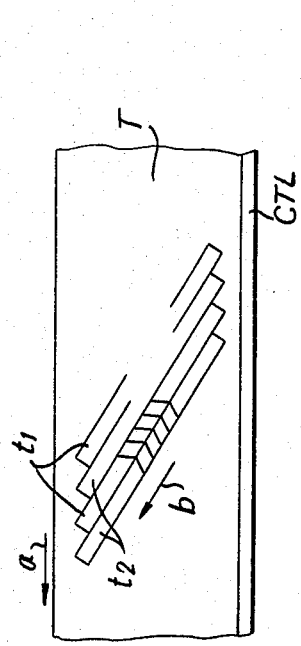
FIG. 4 is a diagrammatic view of a section of magnetic tape illustrating record tracks thereon in which video and audio signals are recorded as known in the prior art.

As set forth above, it is known to combine audio signals with a video signal and to record such combined signals in the slanted tracks on a magnetic tape, and FIG. 1 is a diagram showing the frequency spectrum of these frequency-modulated audio signals suitable for use in recording on the magnetic tape. More specifically, apparatus known heretofore required four individual modulators in order to form the two-channel audio signals into four frequency-modulated signals, that is, two left channel frequency-modulated signals $LF_1$ and $LF_2$ having the respective carrier frequencies $f_1$ and $f_2$ and two right channel frequency-modulated signals $RF_3$ and $RF_4$, having respective carrier frequencies $f_3$ and $f_4$. The relative frequency spectrum of these four audio signals is represented in FIG. 1.

The respective carrier frequencies of these signals are chosen so that each of the four audio signals are contiguous and have approximately the same range of frequency deviation. More specifically, the carrier frequency $f_1$ can be selected as 1.325 MHz, the carrier frequency $f_2$ as 1.475 MHz, $f_3$ as 1.625 MHz, and $f_4$ as 1.775 Mhz. The width of each frequency deviation range is typically chosen to be between 100 to 150 kHz.

Shifting of the chrominance portion of the video signal downwardly on the frequency spectrum is known, and FIG. 2 represents the shift of the chrominance signal in relation to a selected two of the four audio signals of FIG. 1. More specifically, the frequency $f_c$ of the color sub-carrier of the frequency converted chrominance signal is chosen to have a sufficiently low value, for example, 688 kHz, so that the uppermost frequencies of the chrominance signal will be below the carrier $f_1$ of the first video signal $LF_1$. The luminance signal is frequency modulated to form an FM luminance signal Lm, in which the leading end of a sync signal in the luminance signal corresponds to a frequency $f_s$, and a portion of maximum amplitude of the luminance signal corresponds to a frequency $f_p$, which is a predetermined amount higher in frequency than frequency $f_s$. The left FM audio signal $LF_1$, the right FM audio signal $RF_3$, the frequency down-converted chrominance signal C, and the FM luminance signal Lm are mixed to produce a signal $M_1$, which has a frequency spectrum shown in FIG. 2, in which the abscissa represents frequency and the ordinate represents signal level. In FIG. 2 the level of the frequency-converted chrominance signal C is selected to be larger than the levels of the FM audio signals $LF_1$ and $RF_3$ and the level of the frequency-modulated luminance signal $L_m$ is selected to be larger than the level of the chrominance signal C.

The two remaining FM audio channels, specifically, the left FM signal $LF_2$ and the right FM signal $RF_4$, the frequency-converted chrominance signal C and the FM luminance signal $L_m$ are mixed to produce a second mixed signal $M_2$, which has a frequency spectrum as shown in FIG. 3. Note again that the levels of the audio signals compared to the chrominance and luminance portions of the video signal, respectively, are substantially the same as the first mixed signal $M_1$.

The first mixed signal $M_1$, in which the frequency-converted chrominance signal C and frequency-modulated luminance signal $L_m$ are mixed with left FM signal $LF_1$ and right FM signal $RF_3$, is supplied to a rotary magnetic head for recording as slanted tracks on a magnetic tape. Similarly, second mixed signal $M_2$, in which the frequency-converted chrominance signal C and the frequency-modulated luminance signal $L_m$ are mixed with the left FM signal $LF_2$ and the right FM signal $RF_4$ is also fed to a different rotary magnetic head for recording as in the slanted tracks on the magnetic tape. These two heads are chosen to have different azimuth angles to permit the recording of the signals in alternate tracks without the requirement for guard bands, and such tracks are represented in FIG. 4. Specifically, alternately formed or scanned oblique or slanted tracks $t_1$ and $t_2$ are recorded with no guard bands therebetween and the first and second mixed signals $M_1$ and $M_2$ are alternately recorded in such tracks $t_1$ and $t_2$, respectively. The first and second mixed signals $M_1$ and $M_2$ alternately recorded in tracks $t_1$ and $t_2$ have the frequency spectra shown in FIGS. 2 and 3, respectively. Accordingly, it will be noted that in this description of the known recording and/or reproducing apparatus the FM audio signals recorded in each track $t_1$, that is, the left FM signal $LF_1$ and the right FM signal $RF_3$ do not have adjacent frequency bands. Similarly, the FM audio signals recorded in each track $t_2$, that is, the left FM audio signal $LF_2$ and the right FM signal $RF_4$ also do not have adjacent frequency bands. As represented in FIGS. 2 and 3, the audio signals comprising the pair of left FM signals $LF_1$ and right FM signal $RF_3$ have frequency deviation ranges such that they are not adjacent each other and are recorded in a group of common slanted tracks, for example, they are all recorded in track $t_1$, and the other pair of audio signals represented as the left FM signal $LF_2$ and the right FM signal $RF_4$ also have frequency deviation ranges that are not adjacent to each other and are all recorded in another group of common slanted tracks, for example, the tracks identified as $t_2$. Arrow a and arrow b show the running direction of the magnetic tape T and the scanning direction of the rotary heads (not shown), respectively. Additionally, a control signal track CTL is also recorded on magnetic tape T by a fixed head, also not shown. The chrominance signal C and the FM luminance signal $L_m$, which are individually recorded in each of the slanted tracks $t_1$ and $t_2$, correspond to the color video signal of one vertical period, that is, one field.

In reproducing the audio signals from the magnetic tape T, on which the left FM signal $LF_1$ and the right FM signal $RF_3$ are recorded in slanted track $t_1$, and the left FM signal $LF_2$ and the right FM signal $RF_4$ are recorded in the slanted track $t_2$, the left FM signals $LF_1$ and $LF_2$ and the right FM signals $RF_3$ and $RF_4$ are obtained from the magnetic tape and derived through corresponding bandpass filters and are then individually demodulated. In such case, each of the left FM signals $LF_1$ and $LF_2$ and the right FM signals $RF_3$ and $RF_4$ derived from the respective bandpass filters may contain unnecessary left and right FM signals, which have frequency deviation ranges contiguous thereto, as cross talk components from the adjacent slanted tracks.

Figure 5:
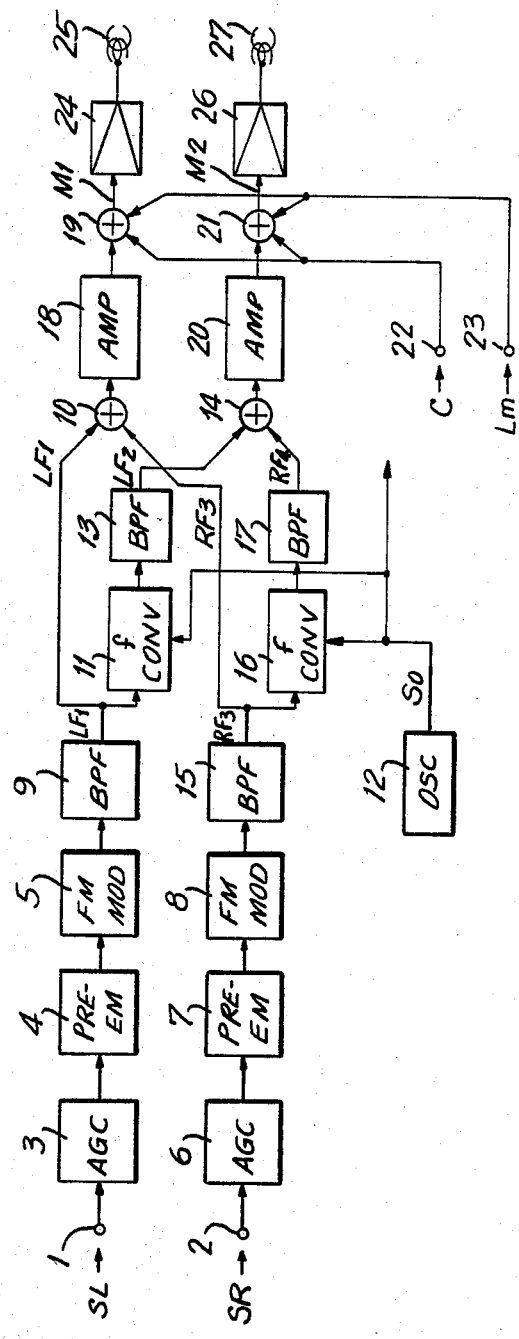
FIG. 5 is a schematic block diagram illustrating a video and audio signal recording apparatus according to an embodiment of this invention.

Referring now to FIG. 5 in detail, a video and audio signal recording apparatus according to an embodiment of this invention has audio signal input terminals 1 and 2 to which there are supplied first and second audio signals, for example, a left channel signal SL and a right channel signal SR of a stereophonic audio signal. These two audio signals are to be recorded in the slanted tracks of a magnetic tape after being combined with the video signal to which they correspond. The left channel signal SR is fed from terminal 1 through automatic gain control amplifying circuit 3 and pre-emphasis circuit 4 to frequency-modulator 5. Similarly, the right channel signal SR is fed from terminal 2 through automatic gain control amplifying circuit 6 and pre-emphasis circuit 7 to a second frequency-modulator 8.

The first frequency-modulator 5 frequency modulates a carrier having a frequency $f_1$, for example, 1.325 MHz, by the left channel signal SL so as to provide a frequency shift or deviation range of the carrier of from 100 to 150 kHz, and this frequency-modulated carrier is fed through bandpass filter 9 so as to produce a frequency-modulated left channel signal or first FM audio signal $LF_1$. This first FM audio signal $LF_1$ is fed to one input of adding circuit 10 and is also fed to the input of frequency convertor 11. Local oscillator 12 provides an output signal $S_0$ having a frequency generally denoted as $f_0$, for example, 150 kHz, that is fed to frequency convertor 11 wherein the left or first audio signal $LF_1$ is converted to produce two FM signals having respective carrier frequencies $f_1 - f_0$ and $f_1 + f_0$. These signals are fed through a bandpass filter 13 that has a passband sufficient to pass only the FM audio signal having the carrier frequency $f_1 + f_0$ and this signal then becomes a second FM audio signal $LF_2$. This second FM audio signal $LF_2$ has a carrier at frequency $f_2$ that is higher than carrier frequency $f_1$, specifically, $f_2 = f_1 + f_0 = 1.475$ MHz, and the width of the frequency deviation range is the same as the first FM audio signal $LF_1$. Second FM audio signal $LF_2$ is fed to one input of a second adding circuit 14. The second FM modulator 8 operates to frequency-modulate a carrier having frequency $f_3$ of, for example, 1.625 MHz, which is greater by 150 kHz than the carrier frequency $f_2$, by the right channel audio signal SR. This frequency modulated carrier $f_3$ is passed through corresponding bandpass filter 15 that produces right FM signal $RF_3$ having frequency deviations of the carrier $f_3$ of from 100 to 150 kHz. Right FM signal $RF_3$ is fed to a second input of adding circuit 10 and is also fed to an input of a second frequency convertor 16. The local oscillator 12 output signal $S_0$ having carrier frequency $f_0$ is also fed to frequency convertor 16, in which the right FM signal $RF_3$ is frequency converted with the output signal $S_0$ of local oscillator 12 to produce two FM signals having respective carrier frequencies $f_3 - f_0$ and $f_3 + f_0$. These two FM signals are fed to bandpass filter 17 having a pass band sufficient to pass only the right FM signal $RF_4$ having a carrier at frequency $f_4$ that is higher than the carrier frequency $f_3$, specifically $f_4 = f_3 + f_0 = 1.775$ MHz. The width of the frequency deviation range of right FM signal $RF_4$ is the same as those of right FM signal $RF_3$ and left FM signals $LF_1$ and $LF_2$, that is, 100 to 150 kHz. The right FM signal $RF_4$ is fed to an input of adding circuit 14.

In the foregoing example of this invention, the carrier frequencies $f_1$, $f_2$, $f_3$, and $f_4$ are selected so that the difference between adjacent carrier frequencies, that is, 150 kHz, will cause any beat frequency noise component that is present between the left FM signals $LF_1$ and $LF_2$ and the right FM signals $RF_3$ and $RF_4$, following demodulation, to be outside the reproduced audio signal band. The relative positions on the frequency spectra of the left FM signals $LF_1$ and $LF_2$ and the right FM signals $RF_3$ and $RF_4$ are as shown in FIG. 1, wherein the signals $LF_1$, $LF_2$, $LF_3$, and $LF_4$ are sequentially arranged with fixed intervals and with respective frequency deviation ranges. In that regard, it is noted that the respective frequency deviation ranges of the adjacent signals are quite close to each other, so that the entire frequency range encompassing the left and right FM signals $LF_1$, $LF_2$, $RF_3$, and $RF_4$ is relatively narrow.

The left FM signal $LF_1$ and the right FM signal $RF_3$ are mixed with each other in adding circuit 10 and the resultant signal is fed through amplifying circuit 18 to an audio and video mixing circuit 19. The right FM signal $RF_4$ and the left FM signal $LF_2$ are combined in adding circuit 14 and the combined output signal fed through amplifying circuit 20 to a second audio and video mixing circuit 21. The frequency converted chrominance signal C is fed in at terminal 22 and the FM luminance signal Lm is fed in at terminal 23. These signals comprise the processed color video signal and are mixed with the combined output signal of adding circuit 10, that is, the left FM signal $LF_1$ mixed with the right FM signal $RF_3$ and with the mixed output signal of adding circuit 14, that is, the left FM signal $LF_2$ mixed with the right FM signal $RF_4$, in audio and video mixing circuits 19 and 21 respectively.

Referring back to FIGS. 2 and 3, the frequency-converted chrominance signal C is obtained from frequency down-converting the chrominance signal separated from an original color video signal so that its color subcarrier is shifted to frequency $f_c$, which is lower than frequency $f_1$, and has a value of 688 kHz. The FM luminance signal Lm is obtained by frequency modulation so that the leading end of the sync signal of the luminance signal separated from the original color video signal corresponds to frequency $f_s$, for example, 4 MHz. This frequency $f_s$ is sufficiently higher than the uppermost carrier frequency $f_4$ of the audio signals, and the white peak or maximum amplitude of the separated luminance signal corresponds to frequency $f_p$, for example, 5.2 MHz, which is higher than the frequency $f_s$ by a predetermined amount, for example, 1.2 MHz. As pointed out, the recording level of the chrominance signal C is larger than the left FM signals $LF_1$ and $LF_2$ by about 15 dB and is also larger than the right signals $RF_3$ and $RF_4$, however, by a somewhat lesser amount. The recording level of the frequency-modulated luminance signal Lm is larger than that of the chrominance signal C by a selected amount for example, 10 dB. As represented in FIGS. 2 and 3, it is seen that the left FM signals $LF_1$ and $LF_2$ and the right FM signals $RF_3$ and $RF_4$ are sequentially located close to one another in the narrow space between the upper boundary of the frequency band of the chrominance signal C and the lower boundary of the frequency band of the frequency-modulated luminance signal Lm at its lower side band, so that the left and right FM signals $LF_1$, $LF_2$, $RF_3$, and $RF_4$ will not suppress the frequency bands of the chrominance signal C and the frequency-modulated luminance signal Lm. It is also noted that the recording levels of the left FM signals $LF_1$ and $LF_2$ and the right FM signals $RF_3$ and $RF_4$ are provided with relatively small level differences therebetween.

The first mixed signal $M_1$ of the mixing circuit 19 containing the chrominance signal C, the frequency-modulated luminance signal Lm, the left FM signal $LF_1$, and the right FM signal $RF_3$ is supplied through recording amplifying 24 to one of the rotary magnetic heads 25. Similarly, the second mixed signal $M_2$ produced by mixing circuit 21 containing the chrominance signal C, the frequency-modulated luminance signal Lm, the left FM signal $LF_2$, and the right FM signal $RF_4$, is supplied through recording amplifying 26 to the second of the rotary heads 27. These two magnetic rotary heads 25 and 27 have different azimuth gap angles and are adapted to alternately form slanted tracks without guard bands therebetween on the magnetic tape and to alternately record the first mixed signal $M_1$ and the second mixed signal $M_2$, as shown in FIG. 4. The first mixed signal $M_1$ has a frequency spectrum as shown in FIG. 2, and the second mixed signal $M_2$ has a frequency spectrum as shown in FIG. 3, both of which are recorded in adjacent slanted tracks on the magnetic tape by the magnetic heads 25 and 27 having different azimuth angles.

When the present invention is desirably applied to a helical scan video tape recorder (VTR), the magnetic record medium is in the form of a magnetic tape which is suitably guided in a helical path about a substantial portion of the periphery of a guide drum (not shown); and the magnetic heads 25 and 27 are diametrically opposed and rotatably mounted in association with the guide drum for movement in a circular path coinciding with the drum periphery. In such case, during recording, heads 25 and 27 are rotated to alternately move obliquely across magnetic tape T, as indicated by arrow b on FIG. 4, while tape T is driven in the longitudinal direction indicated by arrow a, whereby head 25 scans alternating slant or oblique tracks $t_1$ while head 27 scans the other alternating tracks $t_2$. Since heads 25 and 27 have air gaps arranged at substantially different azimuth angles in respect to the plane of rotation of the heads, each records respective mixed audio and video signals $M_1$ and $M_2$ in the respective tracks on tape T and effects magnetism of the magnetic domains in the magnetic coating of the tape in what would appear to be, if such domains where visible, a series of parallel lines or stripes extending across the respective track and each having an orientation that corresponds to the azimuth angle of the respective head.

The present invention is intended to record frequency-converted chrominance signal C and the frequency modulated luminance signal Lm, which constitute a processed color video signal, along with a plurality of FM audio signals arranged the between frequency bands of the chrominance signals C and the FM luminance Lm in common record tracks by rotary magnetic heads. Therefore, because the relative velocity between the magnetic head and the magnetic tape must be sufficiently high to record the color video signal, the quality of the recorded audio signals will not be deteriorated. Also, because the plural channels of audio signals, such as represented by two channel signals of stereophonic left and right signals, can be recorded with a narrow frequency band, the frequency band of the processed color video signal may be kept free from suppression. Therefore, upon reproduction of the color video signal and the audio signals, multi-channel reproduced audio signals are satisfactorily separated from each other with extremely reduced cross talk components that would normally be derived from adjacent slanted tracks.

In the above-described embodiment, the left FM signal $LF_1$ and the right FM signal $RF_3$ are frequency-converted in frequency convertors 11 and 16, and the upper side band components therein obtained by band-pass filters 13 and 17 to produce the left FM signal $LF_2$ and the right FM signal $RF_4$, respectively. Nevertheless, in such operation the carrier frequency $f_3-f_0$ of the nonused lower side band component, which resulted from the frequency conversion of the right FM signal $RF_3$ in the frequency convertor 16, is identical to frequency $f_2$ and, therefore, there is a fear that carrier frequency $f_3-f_0$ can act as a cross talk component in the left FM signal $LF_2$, which has a carrier at frequency $f_2$. Accordingly, in actual use, it is preferable that the left FM signal $LF_2$ and the right FM signal $RF_4$ are frequency-converted and the lower side band components obtained thereby extracted to produce left FM signal $LF_1$ and the right FM signal $RF_3$, respectively, in order to prevent the unused side band component from being contained in the FM audio signal frequency range.

Figure 6:
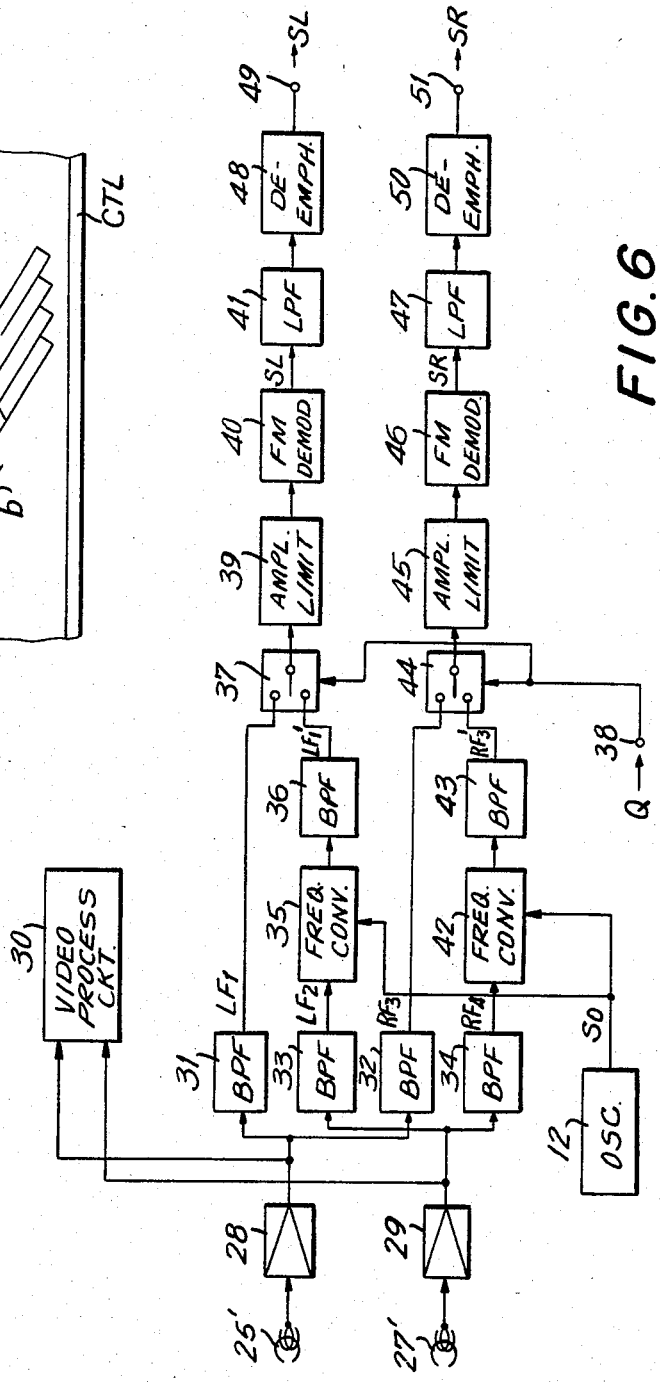
FIG. 6 is a schematic block diagram illustrating a video and audio signal reproducing apparatus for reproducing the video and audio signals recorded by the apparatus of FIG. 5.

A system for reproducing the signals recorded by the system of FIG. 5 according to the present invention is shown in FIG. 6. Rotary magnetic heads 25' and 27' are provided to alternately scan the slant tracks t and $t_2$, which are arranged successively on magnetic tape T without guard bands therebetween, as represented in FIG. 4, and on which the mixed signals $M_1$ and $M_2$ having the frequency spectrum as shown in FIGS. 2 and 3 are recorded by the rotary magnetic heads 25 and 27 of the embodiment of FIG. 5 having respective different azimuth angles and with overlapping periods at the ends of the respective scanning periods each corresponding to one field. Magnetic heads 25' and 27' are suitably controlled so that during one video field magnetic head 25' detects signals recorded in slant track $t_1$ and during the next successive video field rotary magnetic head 27' detects the signals recorded in slant track $t_2$. The magnetic head 25' has an azimuth angle that corresponds to that of the magnetic head that recorded the signals in track $t_1$ and magnetic head 27' has an azimuth angle that corresponds to that of the magnetic head used to record track $t_2$. Accordingly, an output comprising a main reproduced signal of the first mixed signal $M_1$ having a frequency spectrum as shown in FIG. 2 and a cross talk component of the second mixed signal $M_2$ having a frequency spectrum as shown in FIG. 3 is obtained from first magnetic head 25'. Similarly, an output comprising a main reproduced signal of the second mixed signal $M_2$ and a cross talk component of the first mixed signal $M_1$ is obtained from magnetic head 27'. The outputs from magnetic heads 25' and 27' are fed through head amplifiers 28 and 29, respectively, to a video signal processing circuit 30, in which the frequency down-converted chrominance signal C is processed in a well-known manner and the frequency-modulated luminance signal Lm is demodulated. The output of magnetic head 25' is also fed by head amplifier 28 to bandpass filters 31 and 32, which respectively pass therethrough the left FM signal $LF_1$ and the right FM signal $RF_3$. The frequency deviation ranges of the left FM signal $LF_1$ and right FM signal $RF_3$ are spaced from each other because they are centered around carrier frequencies which are spaced further from each other than the deviation ranges represented in FIG. 2 and, thus, the signals are not immediately adjacent each other even though the left FM signal $LF_1$ and the right FM signal $RF_3$ in the output of magnetic head 25' are obtained from the same slant track $t_1$. Thus, these FM signals $LF_1$ and $RF_3$ can be satisfactorily separated from each other by bandpass filters 31 and 32, which deliver the respective signals without mixing therewith any substantial cross talk component of the other. Similarly, the output signal from rotary magnetic head 27' is fed through head amplifier 29 to bandpass amplifiers 33 and 34, which pass left FM signal $LF_2$ and right FM signal $RF_4$, respectively. The frequency deviation ranges of the left FM signal $LF_2$ and right FM signal $RF_4$ are also spaced from each other, since they are based upon carrier signals that are spaced apart by a frequency distance greater than the frequency deviation range and, thus, the left FM signal $LF_2$ and right FM signal $RF_4$ are obtained without any cross talk components, even though they are both derived from the same slant track $t_2$.

The left FM signal $LF_2$ passed by bandpass filter 33 is fed to a frequency-convertor 35, which has as its other input the output signal $S_0$ from oscillator 12. This oscillator may be the same local oscillator utilized in the recording apparatus shown in FIG. 5 and, in any event, the center frequency $f_0$ of the oscillator output signal $S_0$ must be the same as that of the system used to record the information. The frequency convertor 35 then operates to convert left FM signal $LF_2$ with output $S_0$ from local oscillator 12 so as to produce two FM signals having respective carrier frequencies $f_2 - f_0 = f_1$ and $f_2 + f_0$. The FM signal having the carrier frequency $f_1$ is then derived at the output of bandpass filter 36 as the frequency-converted left FM signal $LF_1'$ this left FM signal $LF_1'$ is obtained from a slant track on magnetic tape T that is different than the slant track from which the left FM signal $LF_1$ was derived, through bandpass filter 31, although the frequency deviation range thereof is identical to the frequency deviation range of the left FM signal $LF_1$. The left FM signal $LF_1$ from bandpass filter 31 and the other left FM signal $LF_1'$ from bandpass filter 36 are obtained every alternate field period and are extracted alternately by switch 37, which is controlled by a signal Q supplied at input terminal 38 that actuates switch 37 at every field. The left FM signals $LF_1$ and $LF_1'$ derived alternately from switch 37 are fed through amplitude limiting circuit 39 and are demodulated in frequency demodulator 40 to produce a continuous reproduced left channel signal SL at the output thereof that is fed through low pass filter 41. The right FM signal $RF_4$ from bandpass filter 34 is fed to frequency convertor 42, which also receives the output signal $S_0$ from oscillator 12. The frequency convertor 42 operates to convert the right FM signal $RF_4$ with the output signal $S_0$ having a center carrier frequency $f_0$ so as to produce two FM signals having respective carrier frequencies $f_4 - f_0 = f_3$ and $f_4 + f_0$. The FM signal having a carrier frequency $f_3$ is derived from bandpass filter 43 as a frequency converted right FM signal RF'. This right FM signal $RF_3'$ is obtained from one of the slanted tracks on magnetic tape T that is different than the slanted track from which the right FM signal $RF_3$ was derived by means of bandpass filter 32. Nevertheless, the frequency deviation range thereof is identical to the frequency deviation range of the right FM signal $RF_3$. Because the tracks from which the signals are obtained are different, the right FM signal $RF_3$ from bandpass filter 32 and the right FM signal $RF_3'$ from bandpass filter 43 are obtained alternately every field period and can be extracted alternately by switch 44, which is controlled by the control signal Q fed in at input terminal 38, so that switch 44 is actuated once every field period. The right FM signals $RF_3$ and $RF_3'$ derived alternately by actuation of switch 44 are fed through limiting circuit 45 to a frequency demodulator 46, which produces a continuous right channel signal SR that is fed to low pass filter 47 that passes only signals in the audio frequency band. The purpose of low pass filters 41 and 47 is to remove from the audio signals supplied thereto any beat frequency noise that made occur in the output signals of frequency demodulators 40 and 46 due to the existence of cross talk components in the signals reproduced by heads 25' and 27'.

Nevertheless, it is probable that each of the left FM signals $LF_1$ and $LF_2$ and each of the right FM signals are $F_3$ and $RF_4$ derived from bandpass filters 31, 32, 33, and 34, respectively, contain unnecessary left and right FM signals having frequency deviation ranges contiguous thereto as cross talk components from the adjacent slanted tracks. That is, the left FM signal $LF_1$ passed through bandpass filter 31, as a main signal, may also contain as a cross talk component the left FM signal $LF_2$; the left FM signal $LF_2$ passed through bandpass filter 33 as a main signal may also contain as cross talk components the left FM signal $LF_1$ and the right FM signal $RF_3$; the right FM signal $RF_3$ passed as a main signal through bandpass filter 32 may also contain as cross talk components the left FM signal $LF_2$ and the right FM signal $RF_4$; and the right FM signal $RF_4$ passed as a main signal through bandpass filter 34 may also contain as a cross talk component the right FM signal $RF_3$. Nevertheless, such cross talk components from adjacent tracks are reduced in level due to the effects of the azimuth losses during reproduction and, additionally, because such cross talk signals, which are supplied along with the respective main signals through the bandpass filters 31, 32, 33, and 34, have frequency bands that do not coincide with the pass bands of the respective bandpass filters the levels of these cross talk components as applied to the frequency-convertors 35 and 42, and ultimately to the frequency demodulators 40 and 46, are sufficiently low to further reduce any adverse effects of cross talk. Furthermore, when such cross talk component is contained in the left or right FM signal $LF_1$, $LF_2$, $RF_3$, or $RF_4$, even if the level is relatively low, a beat frequency can be caused between the cross talk component and the left or right FM signal that is being reproduced and, consequently, beat noise appears in the output of either of the two frequency demodulators 40 or 46. Nevertheless, as taught by the present invention the frequencies $f_1$, $f_2$, $f_3$, and $f_4$, which are specifically chosen to be identical to the carrier frequencies of the left FM signals $LF_1$ and $LF_2$ and the right FM signals $RF_3$ and $RF_4$, respectively, are selected to have such interval between the adjacent ones of them so that a beat noise caused by a beat between the demodulated outputs of the left and right FM signals is not contained in the reproduced audio signal frequency band. For example, the intervals between the center frequencies is chosen as 150 kHz and beat noise appearing in the output of frequency demodulator 40 or 46 cannot be passed through low pass filters 41 or 47, respectively, and is thereby eliminated.

Accordingly, the reproduced left channel signal SL, which does not contain any effective component of the right channel signal SR nor any beat noise resultant from cross talk components derived from adjacent slanted tracks, is obtained at the output of low pass filter 41 and, after being passed through de-emphasis circuit 48, is available at audio signal output terminal 49. Similarly, the reproduced right channel signal SR, which does not contain effective component of the left channel signal SL nor any beat noise resulting from cross talk components derived from adjacent slanted tracks, can be obtained at the output of low pass filter 47 and, after being passed through de-emphasis circuit 50, is available at audio signal output terminal 51.

In the inventive embodiment described above in relation to FIG. 6, a single frequency demodulator is used to obtain the reproduced left channel signal SL from two separate and distinct FM signals $LF_1$ and $LF_2$, which are derived from the magnetic tape with the respective different frequency deviation ranges and, similarly, another single frequency demodulator is used to obtain the reproduced right channel signal SR from two right FM signals $RF_3$ and $RF_4$, which are picked up from the magnetic tape also having different frequency deviation ranges, so that the circuit configuration is significantly simplified.

Referring now to FIG. 7, another example of apparatus for recording and/or reproducing video and audio signals according to the present invention is set forth, in which elements and parts corresponding to those of the embodiment of FIG. 6 are provided with the same reference numerals, and further description thereof is omitted here in the interest of eliminating redundancy. In FIG. 7, the reproduction circuit is operative to join segments of reproduced audio signals, which are obtained in response to the FM audio signals derived from two magnetic heads 25' and 27', and produces a continuous reproduced audio signal at the stages following the demodulation of the FM audio signals and prevents the continuous reproduced audio signals from containing any pulsive noise components at the points where the signal parts are joined. In FIG. 7, the left FM signals $LF_1$ and $LF_1'$, which are derived from bandpass filters 31 and 33, respectively, are supplied through amplitude limiting circuits 52 and 53, respectively, to frequency demodulators 54 and 55 each corresponding to frequency demodulator 40 in the embodiment of FIG. 6. The right FM signals $RF_3$ $RF_3$, which are derived from bandpass filters 32 and 34, respectively, are supplied through amplitude limiting circuits 56 and 57, respectively, to frequency demodulators 58 and 59, each corresponding to frequency demodulator 46 in the embodiment of FIG. 6. Segments of reproduced left channel signal SL will appear at the outputs of frequency demodulators 54 and 55 alternately every field period with overlapping portions at their beginning and terminating ends, and segments of reproduced right channel signal SR will appear at the outputs of frequency demodulators 58 and 59 alternately every field, with overlapping signal portions also at their beginning and terminating ends. The outputs of frequency demodulators 54, 55, 58, and 59 are passed through low pass filters 60, 61, 62, and 63, respectively, which pass only signals in the audio frequency band.

Referring now to FIGS. 8A and 8B, it is noted that the reproduced left channel signal, left FM signals $LF_1$ and $LF_1'$ which are derived alternately from the outputs of magnetic heads 25' and 27' and which are supplied to frequency demodulators 54 and 55, are obtained as intermittent segments appearing alternately with overlapping periods $1_p$ at the beginning and terminating ends. Each of the segments of the left FM signals $LF_1$ and $LF_1'$ corresponds to one slanted track $t_1$ or $t_2$. These left FM signals $LF_1$ and $LF_1'$ are frequency-demodulated in frequency demodulators 54 and 55, respectively, and the reproduced channel signal SL, comprised of segments appearing intermittently, is obtained in each of the outputs of the frequency demodulators 54 and 55. The segments of the reproduced left channel signals SL appearing at the outputs of frequency demodulators 54 and 55 are alternately obtained with overlapping periods $1_p$ at the beginning and terminating ends, as shown in FIGS. 8C and 8D, and are thus passed through low pass filters 60 and 61, respectively. The reproduced right channel signal SR is similarly obtained as segments appearing intermittently at each of the outputs of corresponding frequency demodulators 58 and 59.

The segments of the reproduced left channel signal SL obtained from low pass filter 60 and 61, respectively, as shown in FIGS. 8C and 8D, are supplied at the input terminals of switch 64 that is also provided with a control signal Q' fed in at terminal 65, which varies its level from a high $q_1$ to a low $q_2$, or vice versa, during every overlapping period $1_p$. Consequently, control signal Q' alternately assumes high level $q_1$ and low level $q_2$ every other field period, as represented in FIG. 8E. Switch 64 provides the reproduced left channel signal SL derived from low pass filter 60 when control signal Q' is at a high level $q_1$ and delivers reproduced left channel signal SL derived from low pass filter 61, when control signal Q' assumes low level $q_2$. This results in a continuous reproduced left channel signal SL composed of segments shown in FIGS. 8C and 8D joined to each other at locations j in the overlapping period $1_p$ as shown in FIG. 8F.

Because the segments of the reproduced left channel SL, as shown in FIGS. 8C and 8D that are joined by switch actuation of switch 64 are low frequency output signals following frequency-demodulation in frequency demodulators 54 and 55, and are joined during the overlapping time period $1_p$, each two segments that are joined to each other have the same phase as the joint j to be joined thereat with a continuous waveform, provided that magnetic heads 25' and 27' are disposed at the proper positions to scan the slanted tracks. Thus, no pulsive noise component will be present at joint j and the continuous reproduced left channel signal will be formed as shown in FIG. 8F.

Joining of the alternate segments of the reproduced right channel signal SR is accomplished in a similar fashion. Intermittent segments of the reproduced right channel signal SR, are obtained, respectively, from low pass filters 62 and 63 alternately with overlapping periods $1_p$ at their beginning and terminating ends and are supplied to the inputs of switch 66, which also receives the control signal Q' fed in at input terminal 65. Switch 66 is supplied with the control signal Q' represented in FIG. 8E and provides an output of reproduced right channel signal SR derived from low pass filter 62 when control signal Q' is at a high level $q_1$ and the reproduced right channel signal SR derived from low pass filter 63 at the output of switch 66, when control signal Q' has a low level $q_2$. Accordingly, a continuous reproduced right channel signal SR is formed by joining the segments of the reproduced right channel signal SR derived from low pass filters 62 and 63 at the overlapping periods $1_p$. In this situation, as in the left channel, the continuous reproduced right channel signal SR contains no pulsive noise components at the joints of the two alternating segments. Thus, switch circuits 64 and 66 serve to produce continuous reproduced left and right signals SL and SR that are passed through de-emphasis circuits 67 and 68 and are available at audio signal output terminals 69 and 70, respectively. These combined signals are provided without large junction errors, as shown in FIG. 8F, however, even if such junction errors should occur, caused for example by angular deviation from the desired diametrically opposed relationship of rotary heads 25' and 27', and a corresponding phase difference between the demodulated signal portions, any such junction error would involve an abrupt or fast rise time portion of change in the combined signal and the step slope made up of high frequency components would be substantially eliminated by the low-pass filters that are conventionally included in the de-emphasis circuits 67 and 68.

In the embodiment of FIG. 7, two frequency demodulators of the same type are used to obtain the reproduced left channel signal SL from two left FM signals $LF_1$ and $LF_1'$ having respective different frequency deviation ranges and, similarly, another two frequency demodulators of the same type are used to obtain the reproduced right channel signals SR from two right FM signals $RF_3$ and $RF_3'$ that also have different respective deviation ranges. Accordingly, the reproduced outputs obtained in the form of the FM signals derived alternately from the two magnetic heads 25' and 27' are demodulated to form the intermittent reproduced audio signals that are subsequently joined one with another and, therefore, the continuous reproduced audio signal is obtained having no pulsive noise components at the junctures.

In a practical implementation of the circuit arrangement shown in FIG. 7, the segments of reproduced left audio signal SL from low pass filters 60 and 61 are supplied alternately to selecting inputs of switch 64, respectively, through respective capacitors that act to eliminate DC components in the audio signals and added thereto in switch 64 are respective bias voltages each having a predetermined level. Similarly, segments of the reproduced right channel audio signal SR from low pass filter 62 and 63 are fed to inputs of switch 66 through respective capacitors that serve to eliminate DC components and have added thereto respective bias voltages each having a predetermined level in switch 66.

As may be seen clearly from FIGS. 8C and 8D, one of the heads 25' or 27' obtains the reproduced output signal by scanning the tracks of the tape, while the other head will not produce an output because it is out of contact with the tape. Accordingly, the problem arises that segments supplied to switch 64 from low pass filter 60 and segments supplied to switch 64 from low pass filter 61 will have a different average DC voltage level from each other and similarly the segments supplied to switch 66 from low pass filter 62 and from low pass filter 63 may also quite possibly have different average DC voltage levels, because of the above-mentioned period when no output is produced for every other field. Accordingly, the situation is presented in which the reproduced left and right channel signals SL and SR obtained at the outputs of switches 64 and 66, respectively, will not result in smooth connections at the joints of the segments thereof.

Figure 9:
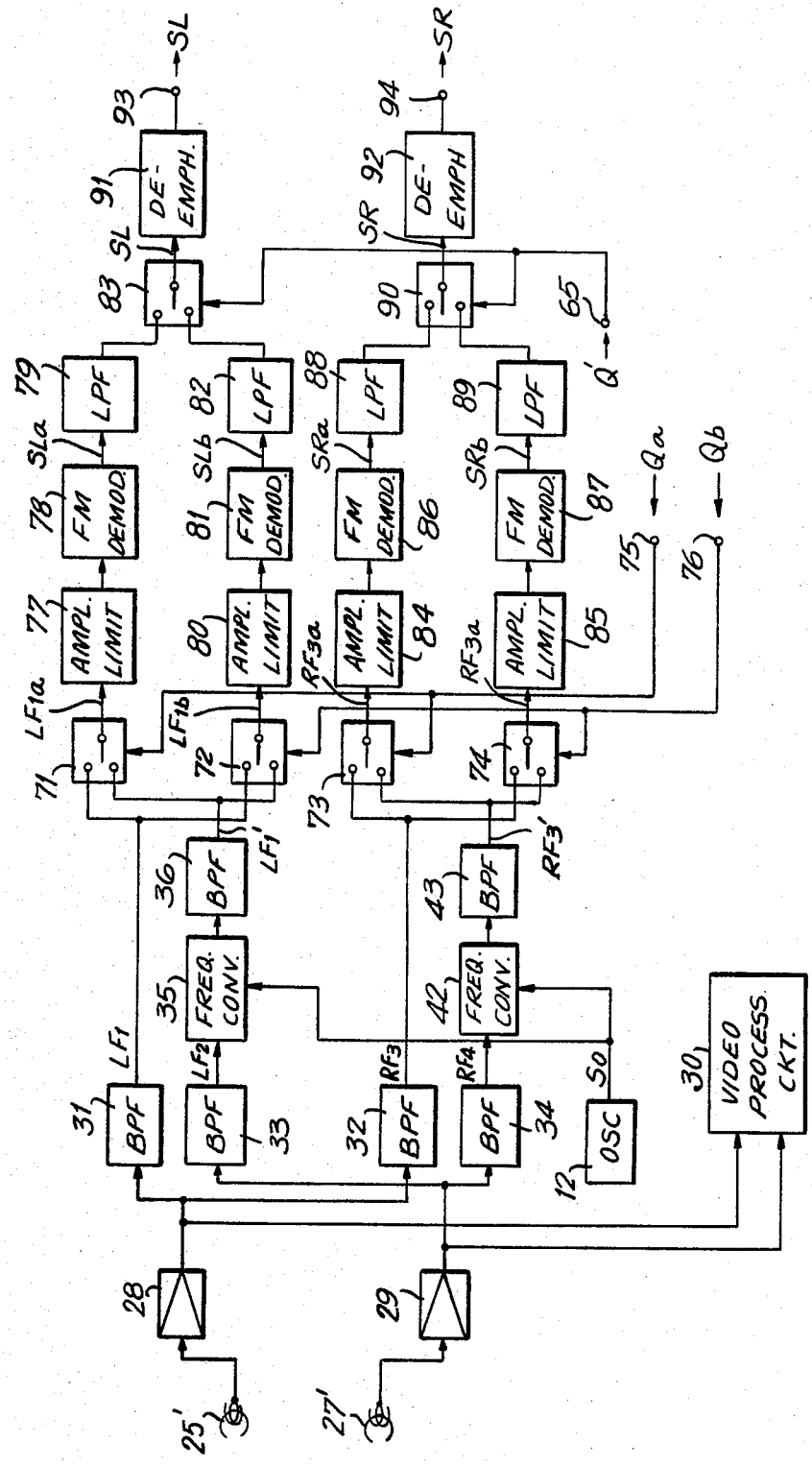
FIG. 9 is a schematic block diagram showing apparatus for reproducing video and audio signals recorded by the apparatus of FIG. 5.

FIG. 9 represents another embodiment of the present invention intended to provide smoothly continuous audio signals and which is specifically intended to avoid the above-mentioned disadvantage that may possibly be present in the embodiment of FIG. 7. In FIG. 9, elements and signals corresponding to those of the embodiment of Fig. 7 are marked with the same reference numerals and characters and further description thereof in connection with the embodiment of FIG. 9 will be omitted. The embodiment of FIG. 9 is adapted to join the reproduced audio signal segments, which are obtained in response to the FM audio signals derived from the two rotary magnetic heads 25' and 27', in order to produce a continuous reproduced signal in the stage following the demodulation of the FM audio signals, so as to prevent pulsive noise components at the jointures of the continuous reproduced audio signal. More specifically, in the embodiment of FIG. 9, the left FM signals $LF_1$ and $LF_1'$ derived from bandpass filters 31 and 36, respectively, are fed to input terminals of two switches 71 and 72, respectively, while the right FM signals $RF_3$ and $RF_3'$ derived from bandpass filters 32 and 43 are supplied to input terminals of switches 73 and 74, respectively. Examining first the reproduced left channel signal, the left FM signals $LF_1$ and $LF_1'$ that are derived alternately from the outputs of magnetic heads 25' and 27' and that are fed to input terminals of switches 71 and 72 are obtained in the form of intermittent segments appearing alternately and having overlapping periods $1_p$ at both the beginning and terminating ends thereof, as represented by the waveforms in FIGS. 10A and 10B. As in the embodiments discussed hereinabove, each of the segments of the left FM signals $LF_1$ and $LF_1'$ corresponds to the signals contained in one of the slanted tracks $t_1$ or $t_2$.

Switch 71 has control signal Qa fed in at terminal 75 and is represented by the high level periods $q_1$, as seen in FIG. 10C, which adopts a high signal level during a period from the time $k_l$ in the overlapping period $1_{p1}$ to a time $k_2$ in the next overlapping period $1_{p2}$, and the low level $q_2$ during the period from the time $k_2$ in overlapping period $1_{p2}$ to the time $k_1$ in the next overlapping period $1_{p3}$. In other words signal Qa switches between the two levels $q_1$ and $q_2$ at the specific times as determined by time points $k_1$, $k_2$ and $k_3$, as represented in FIG. 10. Subsequently, signal $Q_a$ changes its level every overlapping period to take the high level $q_1$ and the low level $q_2$ alternately in the manner shown in FIG. 10C. Switch 71 then provides at its output the left FM signal $LF_1$ to the output when control signal Qa assumes the high level $q_1$ and provides the left FM signal $LF_1'$ at the output thereof when control signal Qa assumes the low voltage level $q_2$. As a result of this switching action under the control of signal Qa, the left FM signal $LF_1'$ is joined to the left FM signal $LF_1$ at the time $k_1$ in overlapping periods and the left FM signal $LF_1$ is joined to the left FM signal $LF_1'$ at time $k_2$ in an overlapping manner, as represented in FIG. 10D, whereby a continuous left FM signal $LF_{1a}$ is provided. This continuous FM signal $LF_{1a}$ is fed through amplitude limiting circuit 78 to frequency demodulator 79 that produces a reproduced left channel signal $SL_a$ containing pulsive noise components N at the jointure of the waveforms corresponding to points $k_1$ and $k_2$, as shown in FIG. 10E. This reproduced left channel signal $SL_a$ is a continuously reproduced signal and is fed through low pass filter 79, however, it still contains pulsive noise components N. Switch 72 is supplied with control signal Qb fed in at terminal 76 and this control signal assumes the high level $q_1$ during a period from point $k_2$ in the overlapping period $1_{p1}$ to the time point $k_1$ in the next overlapping period $1_{p2}$ and assumes a low voltage level $q_2$ during a period from time $k_l$ in overlapping time period $1_{p2}$ to the time point $k_2$ in the next overlapping period $1_{p3}$. Subsequently, control signal Qb alternates every overlapping period to assume the high voltage level $q_l$ and the low voltage level $q_2$, and switch 72 then acts to deliver the left FM channel $LF_1$ to the output thereof when the control signal Qb assumes the high voltage level $q_l$ and delivers the left FM signal $LF_l'$ to the output when control signal Qb assumes the low level $q_2$. This results in the left FM signal $LF_1'$ joined to the left FM signal $LF_l$ at the time point $k_2$ in the overlapping periods and, similarly, the left FM signal $LF_l$ joined to the left FM signal $LF_1'$ at time point $k_l$ in overlapping periods, as represented in FIG. 10G, whereby a continuous left FM signal $LF_{lb}$ is obtained. Continuous left FM signal $LF_{lb}$ is supplied through amplitude limiting circuit 80 to frequency demodulator 81 that produces a reproduced left channel signal $SL_b$ containing pulsive noise components N' at the joints corresponding to time points $k_1$ and $k_2$, as represented in FIG. 10H and this continuous signal is fed through low pass filter 82. Nevertheless, as seen in FIG. 10, the reproduced left channel signal $SL_b$ having been passed through low pass filter 81 still contains pulsive noise components N'.

The reproduced left channel signals $LS_a$ and $LS_b$ are passed through low pass filters 79 and 82, respectively, and are fed to two input terminals of switch 83. The actuation of switch 83 is controlled by the control signal Q' fed in at input terminal 41 and which varies its level from the high level $q_1$ to the low level $q_2$ or vice versa at every point $k_3$ between time points $k_1$ and $k_2$ in the overlapping periods, as represented in FIG. 10I. Switch 83 therefore delivers the reproduced left channel signal $SL_a$ to switch output when control signal Q' assumes the high level $q_l$ and, similarly, delivers the reproduced left channel signal $SL_b$ to the output thereof when the control signal Q' assumes a low signal level $q_2$, the result of these two inputs is delivered alternately to the output as a continuous reproduced left channel signal SL comprised of the reproduced left channels signals $SL_a$ and $SL_b$ extracted alternately, and does not contain pulsive noise components N and N' at the joining of the segments, as represented at FIG. 10J.

Since the reproduced left channel signals $SL_a$ and $SL_b$ are relatively low frequency output signals that are obtained following demodulation in frequency demodulators 78 and 81, respectively, they have the same phase at each point $k_3$ during the overlapping period $1_p$ and, accordingly, can be joined at each point $k_3$ to form a smoothly continuing waveform with no discontinuities. Accordingly, the continuous left channel signal SL does not contain any pulsive noise component at the joints occurring at $k_3$. Moreover, since each of the reproduced left channel signals $SL_a$ and $SL_b$ is supplied continuously to the inputs of switch 83 it is possible to add a DC bias voltage of predetermined level to the reproduced left channel signals $SL_a$ and $SL_b$ in switch 83 and yet the reproduced left channel signals $SL_a$ and $SL_b$ will have the same average DC level, and the reproduced left channel signal SL at the output of switch 83 remains a smoothly connected continuous signal with no noise or discontinunities at the points where the segments are joined.

The right channel signal is joined in the same fashion as the left channel signal and, specifically, switches 73 and 74 are supplied with control signals $Q_a$ and $Q_b$ at terminals 75 and 76, respectively, and a continuous right FM signal $RF_{3a}$ is produced that is joined in the same fashion as the continuous FM signal $LF_{la}$, and a continuous right FM signal $RF_{3b}$ that is joined in the same fashion as the continuous left FM signal $LF_{lb}$ are produced at the outputs of switches 72 and 74, respectively. These continuous right FM signals $RF_{3a}$ and $RF_{3b}$ are passed through amplitude limiters 84 and 85 and are demodulated in frequency demodulators 86 and 87, respectively, thereby producing the reproduced right channel signals $SR_a$ and $SR_b$ containing the pulsive noise components. The reproduced right channel signals $SR_a$ and $SR_b$ are supplied through low pass filters 88 and 89, respectively, to the two inputs of switch 90, to which the control signal Q' from terminal 65 is also supplied. Thus, a continuous reproduced right channel signal SR that does not contain any pulsive noise components is comprised of the reproduced right channel signals $SR_a$ and $SR_b$ that are extracted alternately. The continuous right channel signal SR obtained in this way does not contain any pulsive noise components nor level steps at the joints of the respective segments. The continuous reproduced left and right channel signals SL and SR are passed through de-emphasis circuits 91 and 92, respectively, to the audio signal output terminals 93 and 94, respectively.

While in the above embodiments it was a stereophonic audio signal composed of left and right channels, which were recorded on a magnetic tape in the form of four FM signals along with the video signal, that were being reproduced, it is also possible to employ such apparatus according to the present invention to record other signals, for example, a monaural signal in the form of two FM signals together with the video signal and reproducing from the magnetic tape that was so recorded the video signal and a single channel audio signal.

The above description relates to a single preferred embodiment of the present invention; however, it will be apparent that many modifications and variations can be effected by one skilled in the art without departing from the spirit and scope of the novel concepts of the present invention, wherein the scope of the invention may be determined only be the appended claims.

What is claimed is:

1. A video and audio signal recording apparatus comprising:
   first frequency-modulating means for modulating a first carrier by a first audio signal to be recorded to produce a first FM audio signal;
   first frequency-converting means for converting said first FM audio signal to produce a second FM audio signal having a second carrier frequency different from said first carrier;
   second frequency-modulating means for modulating a third carrier by a second audio signal to be recorded to produce a third FM audio signal;
   second frequency-converting means for converting said third FM audio signal to produce a fourth FM audio signal having a fourth carrier frequency different from said third;
   first mixing means for mixing, with a video signal, two of said FM audio signals which represent said first and second audio signals to be recorded, respectively, and thereby providing a first mixed audio and video signal;
   second mixing means for mixing the other two of said FM audio signals with said video signal and thereby providing a second mixed audio and video signal; and
   first and second magnetic heads having different azimuth angles and respectively receiving said first and second mixed audio and video signals from said first and second mixing means for recording said first and second mixed signals in adjacent record tracks on a magnetic record medium.

2. A video and audio signal recording apparatus according to claim 1, in which said two FM audio signals mixed with said video signal in said first mixing means are said first and third FM audio signals and said other two FM audio signals mixed with said video signal in said second mixing means are said second and fourth FM audio signals.

3. A video and audio signal recording apparatus according to claim 1, further comprising a local oscillator producing an oscillator signal of frequency different than said first and second carrier frequencies and fed to said first and second frequency convertor means, whereby said second carrier has a frequency substantially equal to said first carrier frequency plus said oscillator signal frequency and said fourth carrier has a frequency substantially equal to said third carrier frequency plus said oscillator signal frequency.

4. A video and audio signal recording apparatus according to claim 1, in which said first and second audio signals to be recorded are stereophonic left and right channel signals, respectively.

5. A video and audio signal recording apparatus according to claim 1, in which said first mixing means includes a first audio mixer receiving said first FM audio signal and said third FM audio signal for producing a first combined audio output signal fed to a first audio/video mixer in which said first combined audio output signal is further combined with a video signal for providing said first mixed audio and video signal; and said second mixing means includes a second audio mixer receiving said second FM audio signal and said fourth FM audio signal for producing a second combined audio output signal fed to a second audio/video mixer in which said second combined audio output signal is further combined with said video signal for producing said second mixed audio and video signal.

6. A video and audio signal recording apparatus according to claim 5, in which said video signal includes at least a luminance component and a chrominance component.

7. A video and audio reproducing apparatus for reproducing video and audio signals recorded as first and second mixed signals with different azimuth angles in adjacent first and second parallel tracks, respectively, on a magnetic record medium and in which said first mixed signal comprises a video signal mixed with two audio signals having different carrier frequencies and said second mixed signal comprises said video signal mixed with two other FM audio signals having different carrier frequencies, comprising:
   first and second magnetic head means having different azimuth angles corresponding to said azimuth angles with which said first and second mixed signals are recorded for scanning adjacent first and second tracks to alternately reproduce therefrom said first and second mixed signals;
   filter means receiving said first and second mixed signals for separating from said first mixed signal a first FM audio signal and a second FM audio signal and for separating from said second mixed signal a third FM audio signal and a fourth FM audio signal;
   first frequency convertor means for converting the carrier of said second FM audio signal to a frequency substantially equal to the carrier of said first FM audio signal;
   second frequency-convertor means for converting the carrier of said third FM audio signal to a frequency substantially equal to the carrier of said fourth FM audio signal;
   first switch means receiving said first FM audio signal and said second FM audio signal having a frequency converted carrier for producing a first continuous FM audio output signal formed of alternate segments thereof;
   second switch means receiving said fourth FM audio signal and said third FM audio signal having a frequency converted carrier for producing a second continuous FM audio output signal formed of alternate segments thereof; and
   frequency-demodulating means receiving said first and second continuous FM audio output signals and demodulating therefrom first and second audio signals, respectively.

8. A video and audio reproducing apparatus according to claim 7, in which said filter means comprises four individual bandpass filters each having a different center bandpass frequency.

9. A video and audio reproducing apparatus according to claim 7, further comprising oscillator means producing an oscillator signal having a frequency different than the carrier of said first FM audio signal and the carrier of said second FM audio signal and fed to said first and second frequency-convertor means for converting the carrier of said second FM audio signal to a frequency substantially equal to the carrier frequency of said first FM audio signal minus the frequency of said oscillator signal and for converting the carrier frequency of said fourth FM audio signal to a frequency substantially equal to the carrier frequency of said third FM audio signal minus the frequency of said oscillator.

10. A video and audio reproducing apparatus according to claim 7, in which said frequency-demodulating means includes de-emphasis means having low pass filter means for smoothing transitions between the demodulated portions of said first audio signal.

11. A video and audio reproducing apparatus according to claim 7, in which said first and second reproducing head means are adapted to reproduce said first and second frequency modulated audio signals alternately every video field with overlapping time periods.

12. In apparatus for recording and reproducing video and audio signals in successive parallel record tracks on a magnetic record medium: the combination of recording circuit means comprising frequency-modulating means for modulating a first audio signal to be recorded by a first carrier to produce a first FM audio signal, and frequency-convertor means for converting said first FM audio signal to a second FM audio signal having a different carrier frequency and second frequency-modulating means for modulating a second audio signal to be recorded to produce a third FM audio signal having a carrier different than said first and second FM audio signals and second frequency-convertor means for converting said third FM audio signal to a fourth FM audio signal having different carrier frequency than said first, second, or third FM audio signals, first mixing means for mixing with a video signal two of said FM audio signals which represent said first and second audio signals to be recorded, respectively, and providing a first mixed audio and video signal, and second mixing means for mixing the other two of said FM audio signals with said video signal and providing a second mixed audio and video signal;

first and second magnetic head means having different azimuth angles and scanning adjacent first and second ones of said successive record tracks on a record medium, said first and second magnetic head means being operative in a record mode of the apparatus to receive said first and second mixed audio and video signals, respectively, for recording in said first and second adjacent record tracks and said first and second head means being operative in a reproducing mode of the apparatus to reproduce alternately first and second mixed audio and video signals from said first and second adjacent record tracks, respectively; and reproducing circuit means comprising means for separating said two FM audio signals from a reproduced first mixed audio and video signal and for separating said other two FM audio signals from a reproduced second mixed audio and video signal, combining means for sequentially combining said alternately reproduced portions of the first and second audio signals, thereby providing substantially continuous frequency modulated first and second audio signals, and frequency demodulating means receiving said substantially continuous frequency modulated first and second audio signals and demodulating therefrom said first and second audio signals.

13. Apparatus for recording and reproducing video and audio signals according to claim 12, in which said two FM audio signals mixed with said video signal in said first mixing means are said first and third FM audio signals and said other two FM audio signals mixed with said video signal in said second mixing means are said second and fourth FM audio signals.

14. Apparatus for recording and reproducing video and audio signals according to claim 12, further comprising a local oscillator producing an oscillator signal of frequency different than said first and second carrier frequencies and fed to said first and second frequency-convertor means, whereby said second carrier has a frequency substantially equal to said first carrier frequency plus said oscillator signal frequency and said fourth carrier has a frequency substantially equal to said third carrier frequency plus said oscillator signal frequency.

15. Apparatus for recording and reproducing video and audio signals according to claim 12, in which said first mixing means includes a first audio mixer receiving said first FM audio signal and said third FM audio signal for producing a first combined audio ouput signal fed to a first audio/video mixer in which said first combined audio output signal is further combined with a video signal for producing said first mixed audio and video signal; and said second mixing means includes a second audio mixer receiving said second FM audio signal and said fourth FM audio signal for producing a second combined audio output signal fed to a second audio/video mixer in which said second combined audio output signal is further combined with said video signal for producing said second mixed audio and video signal.

16. Apparatus for recording and reproducing video and audio signals, according to claim 12, in which said means for separating comprises four individual bandpass filters each having a different center bandpass frequency.

* * * * *